(12) United States Patent　(10) Patent No.:　US 12,638,288 B2
　　Pastor　　　　　　　　　　　　　　(45) Date of Patent:　May 26, 2026

(54) HYDRODYNAMIC ACQUISITION SYSTEM FOR VESSEL-BASED UNDERWATER SENSING

(71) Applicant: FNV IP B.V., Leidschendam (NL)

(72) Inventor: Chad Pastor, Lafayette, LA (US)

(73) Assignee: FNV IP B.V., Leidschendam (NL)

( * ) Notice: Subject to any disclaimer, the term of this patent is extended or adjusted under 35 U.S.C. 154(b) by 754 days.

(21) Appl. No.: 18/076,232

(22) Filed: Dec. 6, 2022

(65) Prior Publication Data

US 2024/0183659 A1　　Jun. 6, 2024

(51) Int. Cl.
　　*G01C 13/00*　　　　(2006.01)
(52) U.S. Cl.
　　CPC ................................... *G01C 13/00* (2013.01)
(58) Field of Classification Search
　　CPC ......... G01C 13/00; B63C 11/48; G01S 7/521; B63B 17/0081; B63B 2017/0054
　　See application file for complete search history.

(56) References Cited

U.S. PATENT DOCUMENTS

2019/0317237 A1\* 10/2019 Hawa ................... G10K 11/006

FOREIGN PATENT DOCUMENTS

KR　　　101665877 B1 \* 10/2016 ............. B63C 11/00

\* cited by examiner

*Primary Examiner* — Tarun Sinha
(74) *Attorney, Agent, or Firm* — Polsinelli PC

(57)　　　　　　　ABSTRACT

Disclosed herein is a vessel-mounted sensor acquisition apparatus including a coupler plate, an upper attachment portion, a sensor array portion, and a first winged pipe segment. The coupler plate includes a rotatable coupler and a rigid coupler. The upper attachment portion includes a first pipe attachment that is rotatably coupled to the rotatable coupler of the coupler plate and a second pipe attachment that is removably coupled to the rigid coupler of the coupler plate. The sensor array portion includes a plurality of remote sensing sensors. The first winged pipe segment, which includes a vibration-reducing wing, is coupled between the upper attachment portion and the sensor array portion.

20 Claims, 10 Drawing Sheets

HYDRODYNAMIC ACQUISITION SYSTEM FOR VESSEL-BASED UNDERWATER SENSING

FIELD

The present disclosure relates to an underwater sensing and acquisition system and methods of use thereof. Specifically, the system includes a modular pole that has sensors mounted thereto.

BACKGROUND

Many industries require underwater surveillance (e.g., sensing, imaging, etc.) to track or otherwise detect underwater objects and underwater processes. However, conventional underwater sensing and imaging systems are expensive and may be difficult to deploy. For example, conventional systems may require project-specific platforms to deploy various tracking cameras, sensors, etc. When an underwater sensing system is deployed using a vessel (e.g., a ship, a boat, etc.), a project-specific platform can be a fixed installation associated with the underwater sensing system and/or can be an installation that is customized for one or more of (or both) the underwater sensing system and the associated vessel. In many cases, conventional systems that are deployed based on the use of project-specific platforms and/or sensor-specific platforms may be cumbersome to design, install, and deploy.

Therefore, there is a need for an underwater imaging system that is easy to transport to different projects, is easy to use, and is and cost-effective.

SUMMARY

Aspects of the present disclosure include a vessel-mounted sensor acquisition apparatus. The vessel-mounted sensor acquisition apparatus can include a coupler plate, an upper attachment portion, a sensor array portion, and a first winged pipe segment. The coupler plate can include a rotatable coupler and a rigid coupler. The upper attachment portion can include a first pipe attachment that is rotatably coupled to the rotatable coupler of the coupler plate and a second pipe attachment that is removably coupled to the rigid coupler of the coupler plate. The sensor array portion can include a plurality of remote sensing arrays and/or a plurality of remote sensors (e.g., remote sensing sensors). The first winged pipe segment, which can include a vibration-reducing wing, can be coupled between the upper attachment portion and the sensor array portion.

In certain instances, the first winged pipe segment can include a first distal end and a second distal end. The first distal end of the first winged pipe segment can be coupled to the upper attachment portion of the vessel-mounted sensor acquisition apparatus. The second distal end of the first winged pipe segment can be coupled to the sensor array portion of the vessel-mounted sensor acquisition apparatus.

In certain instances, the vessel-mounted sensor acquisition apparatus can include a second winged pipe segment, which can include a vibration-reducing wing. The second winged pipe segment can be coupled between the first winged pipe segment and the sensor array portion.

In certain instances, the first winged pipe segment can include a hollow pipe segment and a wing portion. The wing portion can enclose an outer circumference of the hollow pipe segment. In certain instances, the wing portion can be disposed along an outer surface of the hollow pipe segment.

In certain instances, the first winged pipe segment can include a wing portion. The wing portion can be symmetric about a plane that extends through a longitudinal axis of the first winged pipe segment. The wing portion can be configured to mitigate vortex induced vibrations when the vessel-mounted sensor acquisition apparatus is in a deployed position. In certain instances, a longitudinal axis of the first winged pipe segment can be parallel to a longitudinal axis of the vessel-mounted sensor acquisition apparatus.

In certain instances, the first pipe attachment can be orthogonal to a longitudinal axis of the vessel-mounted sensor acquisition apparatus. The second pipe attachment can be orthogonal to a longitudinal axis of the vessel-mounted sensor acquisition apparatus.

In certain instances, an axis of rotation associated with the rotatable coupler of the coupler plate can be perpendicular to a longitudinal axis of the vessel-mounted sensor acquisition apparatus.

In certain instances, the rotatable coupler can be rotatable between a stowed position associated with the vessel-mounted sensor acquisition apparatus and a deployed position associated with the vessel-mounted sensor acquisition apparatus.

Aspects of the present disclosure include a remote sensing acquisition system. The remote sensing acquisition system can include a coupler plate, an upper attachment portion, a sensor array portion, and a first winged pipe segment. The coupler plate can include a rotatable coupler and a rigid coupler. The upper attachment portion can include a first pipe attachment that is rotatably coupled to the rotatable coupler of the coupler plate and a second pipe attachment that can be removably coupled to the rigid coupler of the coupler plate. The sensor array portion can include a plurality of remote sensing arrays and/or a plurality of remote sensors (e.g., remote sensing sensors). The first winged pipe segment, which can include a vibration-reducing wing, can be coupled between the upper attachment portion and the sensor array portion.

In certain instances, the first winged pipe segment can include a first distal end and a second distal end. The first distal end of the first winged pipe segment can be coupled to the upper attachment portion of the remote sensing acquisition system. The second distal end of the first winged pipe segment can be coupled to the sensor array portion of the remote sensing acquisition system.

In certain instances, the remote sensing acquisition system can include a second winged pipe segment, which can include a vibration-reducing wing. The second winged pipe segment can be coupled between the first winged pipe segment and the sensor array portion.

In certain instances, the first winged pipe segment can include a hollow pipe segment and a wing portion. The wing portion can enclose an outer circumference of the hollow pipe segment. In certain instances, the wing portion can be disposed along an outer surface of the hollow pipe segment.

In certain instances, the first winged pipe segment can include a wing portion. The wing portion can be symmetric about a plane that extends through a longitudinal axis of the first winged pipe segment. The wing portion can be configured to mitigate vortex induced vibrations when the remote sensing acquisition system is in a deployed position. In certain instances, a longitudinal axis of the first winged pipe segment can be parallel to a longitudinal axis of the remote sensing acquisition system.

In certain instances, the first pipe attachment can be orthogonal to a longitudinal axis of the remote sensing acquisition system. The second pipe attachment can be orthogonal to a longitudinal axis of the remote sensing acquisition system.

In certain instances, an axis of rotation associated with the rotatable coupler of the coupler plate can be perpendicular to a longitudinal axis of the remote sensing acquisition system.

In certain instances, the rotatable coupler can be rotatable between a stowed position associated with the remote sensing acquisition system and a deployed position associated with the remote sensing acquisition system.

Other advantages of the invention will become apparent from the following description taken in connection with the accompanying drawings, wherein is set forth by way of illustration and example an embodiment of the present invention.

BRIEF DESCRIPTION OF THE DRAWINGS

In order to describe the manner in which the advantages and features of the present inventive concept can be obtained, reference is made to embodiments thereof which are illustrated in the appended drawings. Understanding that these drawings depict only exemplary embodiments of the present inventive concept and are not, therefore, to be considered to be limiting of its scope, the principles herein are described and explained with additional specificity and detail through the use of the accompanying drawings in which.

DETAILED DESCRIPTION

Figure 1A:
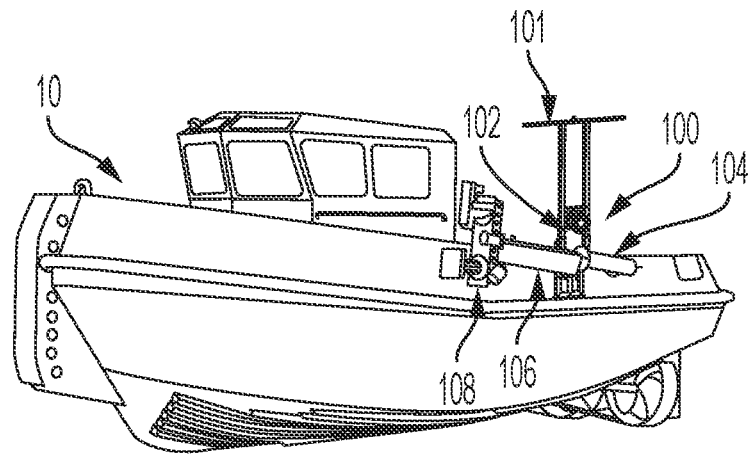
FIGS. 1A-1B illustrate perspective views of a vessel with a sensor acquisition apparatus mounted thereto in its stowed position and its deployed position, respectively, according to an exemplary embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Provided herein is a sensor acquisition apparatus. The apparatus includes a plate and a pole. The plate includes a rotating coupling and a fixed coupling. The plate is mounted, directly or indirectly, to a vessel such that the rotating coupling and the fixed coupling extend outwards from the vessel. The pole includes an attachment portion, which includes a first attachment and a second attachment, and one or more winged pipe segments (e.g., collectively referred to as a "winged portion"). The first attachment of the attachment portion of the pole is coupled to the rotating coupling of the plate, such that the pole rotates about an axis that is coincident to the axis of the rotating coupling. The attachment portion of the pole can be provided at a first distal end of the pole, and one or more remote sensing arrays can be provided at a second distal end of the pole (e.g., the attachment portion and the one or more remote sensing arrays can be provided at opposite distal ends of the pole).

In some aspects, the pole can be rotated between a survey position (e.g., a deployed position) and a transit position (e.g., a stowed position). For example, in the survey position, the distal end of the pole that is coupled to the one or more remote sensing arrays can be held below the surface of the water (e.g., the one or more remote sensing arrays can be positioned below the surface of the water when the pole is rotated to or otherwise engaged in the survey position). In the transit position, the distal end of the pole that is coupled to the one or more remote sensing arrays can be held out of or otherwise above the surface of the water. In some examples, the pole can be rotated through approximately 90 degrees of rotation between the survey position and the transit position.

To inhibit rotation of the pole in its survey position, the second attachment portion of the pole can be removably coupled to the fixed coupling of the plate. In this manner, a vessel upon which the presently disclosed sensor acquisition apparatus is provided can perform a survey (e.g., can perform data acquisition using the one or more remote sensing arrays) with the pole remaining in its survey position. After completing the survey, or to otherwise stow the pole, the second attachment portion of the pole can be uncoupled from the fixed coupling of the plate such that the pole can rotate into its transit position. In some examples, the one or more remote sensing arrays described above can be removably coupled to the end of the pole opposite the attachment portion, such that the one or more remote sensing arrays can survey the sea floor when the pole is in its survey position. In some examples, the one or more remote sensing arrays can be combined in a remote sensing device or other housing. The one or more remote sensing arrays can be electrically coupled to corresponding electrical power and/or electrical power distribution lines that are included in or otherwise attached to the pole. In some examples, the one or more remote sensing arrays may be coupled to wired communication lines or cables that are also included in or otherwise attached to the pole.

The sensor acquisition apparatus described herein may provide significant benefits over conventional survey systems. As one example, the sensor acquisition apparatus is a modular platform to mount any remote sensing device to any vessel. In other words, the components of the apparatus are interchangeable. For example, components of the apparatus can be changed in or out (e.g., swapped). Additionally, components can be added to the apparatus or removed from the apparatus depending on the specific application (e.g., depth of survey, remote sensing payload, vessel speed or other survey conditions or parameters, etc.). Thus, the apparatus can easily be reconfigured for new projects without the need to configure the vessel with a project-specific platform for each desired configuration of different survey depths, different survey parameters, different remote sensing payloads, etc.

The sensor acquisition apparatus can be configured to mob (e.g., mobilization of a vessel at the beginning of a project) to any vessel, such that the apparatus can perform surveys at various depths. In some examples, the apparatus 100 can be configured to survey to a water depth of approximately 100 meters. In some examples, the apparatus 100 can be configured to survey to a water depth of approximately 1,000 meters. In some examples, the apparatus 100 can be configured to survey to a water depth of approximately 10,000 meters. Accordingly, the apparatus can support various payloads. In some examples, the apparatus 100 can support remote sensing payloads up to 1,000 pounds. In some examples, the apparatus 100 can support remote sensing payloads up to 2,500 pounds. In some examples, the apparatus 100 can support remote sensing payloads up to 4,000 pounds. Thus, the apparatus can be used in a variety of applications. For example, the apparatus can be used as a replacement for gondola mounted or center of engine sensors (e.g., oil field). Moreover, the apparatus can be used in geophysical mapping, hydrographic mapping, metocean (meteorology and oceanography) mapping, and route mapping, among various other applications.

As another example of benefits over conventional survey systems, the presently disclosed sensor acquisition apparatus may be more cost effective than conventional survey systems. In some embodiments, the components of the apparatus can be bolted together at flanged connections, which may save time and money when mobbing (i.e., mobilization of a vessel at the beginning of a project) the apparatus to a vessel. For example, the apparatus may reduce or eliminate the need for welding components together to mob to a vessel. Additionally, the components of the apparatus can easily be reused in future projects. As another example, the sensor acquisition apparatus can support all remote sensors on a single pole with one high grade inertial measurement unit (IMU) system. This may reduce or eliminate the need for an IMU on each individual pole that would otherwise be used to provide the various remote sensors (e.g., such as in conventional approaches where different remote sensors are provided using multiple different vessel-mounted poles). As another example, the apparatus can support surveys at high speeds (e.g., greater than 7 knots), which may increase the production rate of surveying. In some examples, the apparatus can sustain survey speeds of approximately 8 to 14 knots. Additionally, the apparatus can sustain low speeds (e.g., less than 7 knots).

As another example of benefits over conventional survey systems, the sensor acquisition apparatus may reduce vibration and/or vibration-related effects often associated with surveying. For example, the sensor acquisition apparatus can include a winged portion that comprises one or more winged pipe segments, as noted above. In some aspects, the one or more winged pipe segments can be designed to reduce or minimize vibrations of the pole while in the survey position, and therefore reduce or minimize vibration-induced noise or artifacts that may otherwise be present in the sensor data acquired using the remote sensing array(s) coupled to the distal end of the pole (e.g., below the winged portion/one or more winged pipe segments). In addition to the winged pipe segment(s) reducing vortex-induced vibrations from the sea, the apparatus can eliminate the need for conventional forward or back pull lines that are used in existing approaches to surveying. Accordingly, it is further contemplated that the presently disclosed sensor acquisition apparatus can be used to eliminate strumming-induced vibrations and noise associated with forward and/or back pull lines.

As another example of benefits over conventional survey systems, the presently disclosed sensor acquisition apparatus is portable. For example, because it is modular, the apparatus can be disassembled into individual components that may be more easily be shipped or otherwise transported (e.g., via air freight, etc.). Once the apparatus is delivered, it can quickly be assembled and mobbed (i.e., mobilization of a vessel at the beginning of a project) to any vessel. Because it is portable, the apparatus can easily be shipped to foreign countries and mobbed onto vessels of opportunity.

Figure 1B:
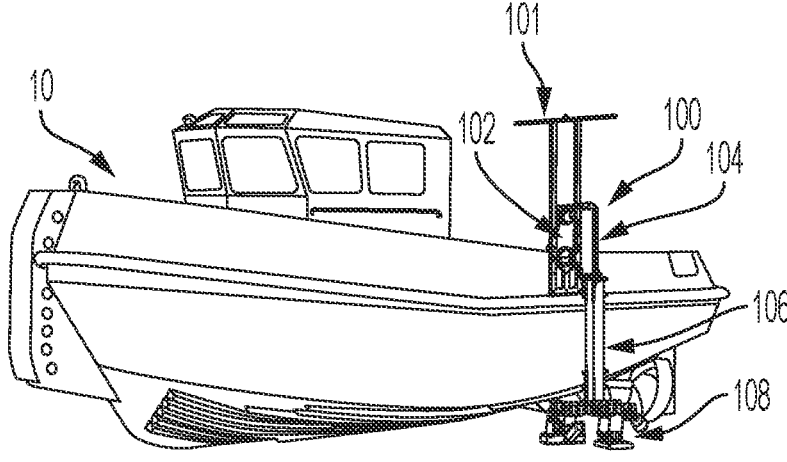

Turning to FIGS. 1A-1B, an exemplary embodiment of the sensor acquisition apparatus 100 is illustrated. The apparatus 100 can be mobbed to either side (e.g., port, starboard) of any vessel 10. When mounted to a vessel (e.g., such as vessel 10), the apparatus 100 may also be referred to as a vessel-mounted sensor acquisition apparatus. As illustrated in FIGS. 1A-1B, the vessel 10 can be, for example, a 20-foot to 80-foot vessel. However, the apparatus 100 can be configured to mob to larger vessels, as illustrated for example in FIGS. 7A-7B and FIGS. 8A-8C, without departing from the scope of the present disclosure. In some embodiments, the apparatus 100 can include an integrated global positioning system (GPS) antenna system to allow for pre dimcon to derive precise offsets before vessel mobbing. The primary pre dimcon can reduce installation costs of the apparatus 100 over traditional systems because, using the primary pre dimcon, the apparatus 100 can be installed on the vessel 10 as an entire calibrated unit instead of individual, uncalibrated parts. For example, the primary pre dimcon can decrease the mob time by approximately two days, which, in some examples, can reduce the installation costs by approximately $60,000.

The apparatus 100 includes a coupler plate 102 that is mounted to the vessel 10. For example, the coupler plate 102 can be removably coupled, directly or indirectly, to a side of the vessel 10. An upper attachment portion 104 is rotatably coupled to the coupler plate 102, such that it can rotate (e.g., pivot) with respect to the coupler plate 102. Rotating the upper attachment portion 104 can transition the apparatus 100 between a stowed position (as illustrated for example in FIG. 1A) and a deployed position (as illustrated for example in FIG. 1B). The stowed position may also be referred to as a transit position, and the deployed position may also be referred to as a survey position, as previously noted above.

In its stowed position (e.g., transit position), the apparatus 100 is out of the water such that it is positioned for transit. For example, the apparatus 100 can be substantially horizontal (e.g., relative to the surface of the water and/or relative to a deck of the vessel 10) when in the stowed position. In some cases, the apparatus 100 can be substantially parallel to the surface of the water and/or a deck of the vessel 10 when in the stowed position. When the vessel 10 is on the water and the apparatus 100 is in its deployed position (e.g., survey position), a portion of the apparatus 100 is in the water such that it is positioned to perform a survey. For example, the apparatus 100 can be substantially vertical in the deployed position. In some aspects, the apparatus 100 can be substantially perpendicular to the surface of the water and/or a deck of the vessel 10 when in the deployed position.

The apparatus 100 can include a davit 101, which can be removably coupled to the side of a vessel upon which the apparatus is mounted (e.g., vessel 10). The davit 101 can include a winch that can be used to transition the apparatus 100 from its deployed position to its stowed position. In other words, the winch can be connected to the apparatus 100 and the winch can be retracted to rotate the apparatus 100 into its stowed position.

A winged pipe segment 106 extends from the upper attachment portion 104. A sensor array portion 108 is removably coupled to the winged pipe segment 106 (e.g., at the distal end of winged pipe segment 106 opposite the upper attachment portion 104). Thus, when the apparatus 100 is deployed and performing a survey, at least a portion of the winged pipe segment 106 and the sensor array portion 108 are in the water. In some embodiments, the sensor array portion 108 is fully submerged when the apparatus 100 is in the deployed position (e.g., the survey position). The winged pipe segment 106 reduces vortex induced vibrations from the sea and the sensor array portion 108 provides underwater imaging to survey the sea floor. For example, the sensor array portion 108 can include one or more remote sensing arrays, as described previously above.

Figure 2:
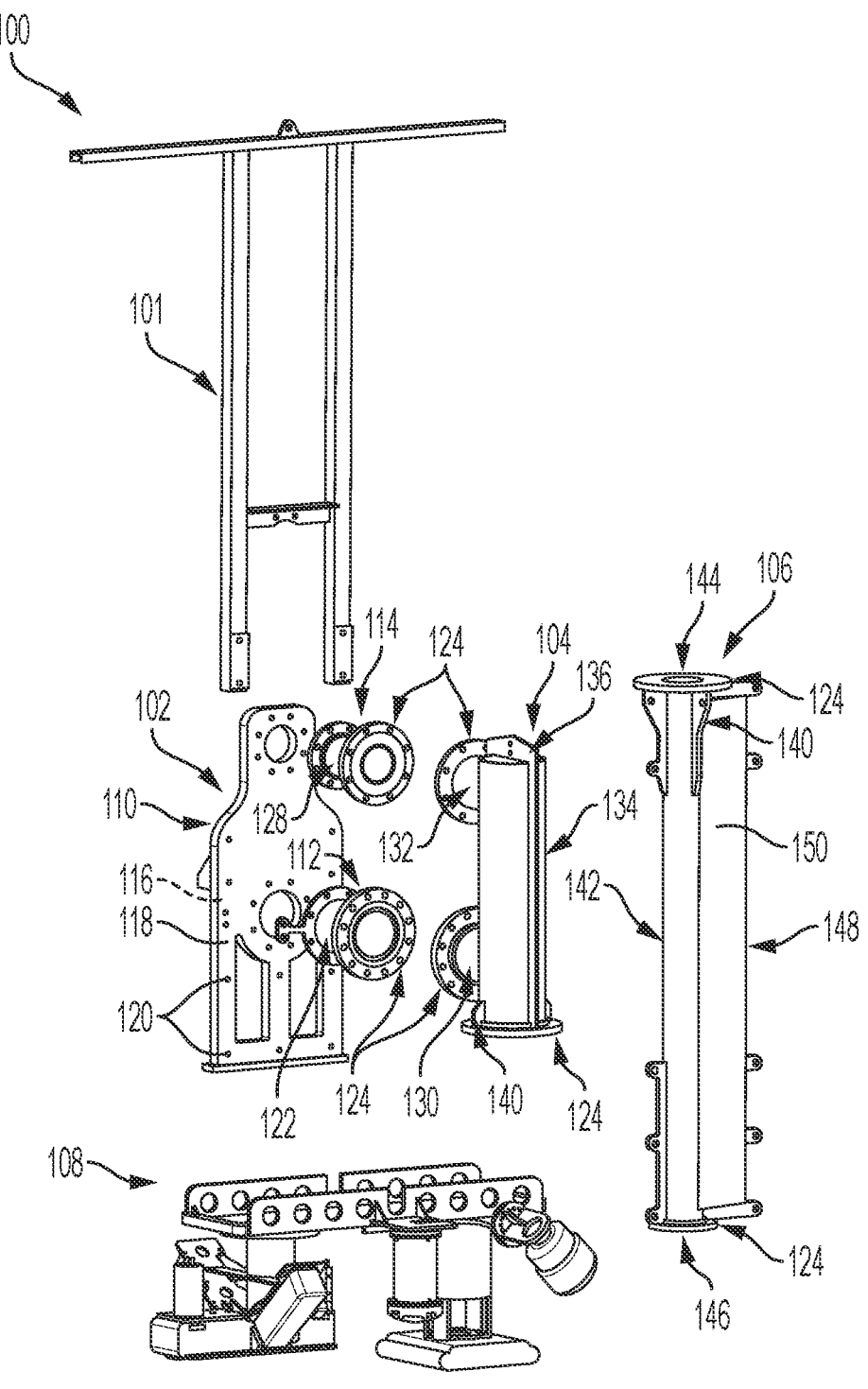
FIG. 2 illustrates a perspective, exploded view of a sensor acquisition apparatus.

FIG. 2 illustrates an exploded view of an exemplary embodiment of the sensor acquisition apparatus 100. The apparatus 100 can include a coupler plate 102, an upper attachment portion 104, a winged pipe segment 106, and a sensor array portion 108. Additionally, the apparatus can include a davit 101 with a winch mounted thereto.

In some embodiments, the apparatus 100 is modular. For example, the apparatus 100 can be disassembled, in whole or in part, as illustrated in FIG. 2. In some examples, the apparatus 100 can be disassembled so that one or more of its components can be removed and replaced (e.g., swapped). Individual components can be removed and replaced to provide a different configuration of the apparatus 100 (e.g., replacing a shorter winged pipe segment 106 with a longer winged pipe segment 106) and/or when components are at or near the end of their service life. Moreover, additional components can be added to the apparatus 100 (e.g., adding a second winged pipe segment 106b to a first winged pipe segment 106a, as illustrated for example in FIGS. 7A-7B, to increase its length).

In some examples, the apparatus 100 can be disassembled so that it is portable, and one or more components can be transported (e.g., shipped) to a different location, such as a new project location. From its disassembled configuration, the apparatus 100 can be assembled such that it can be mounted to the side of a vessel 10, as illustrated for example in FIGS. 1A-1B.

Figure 3:
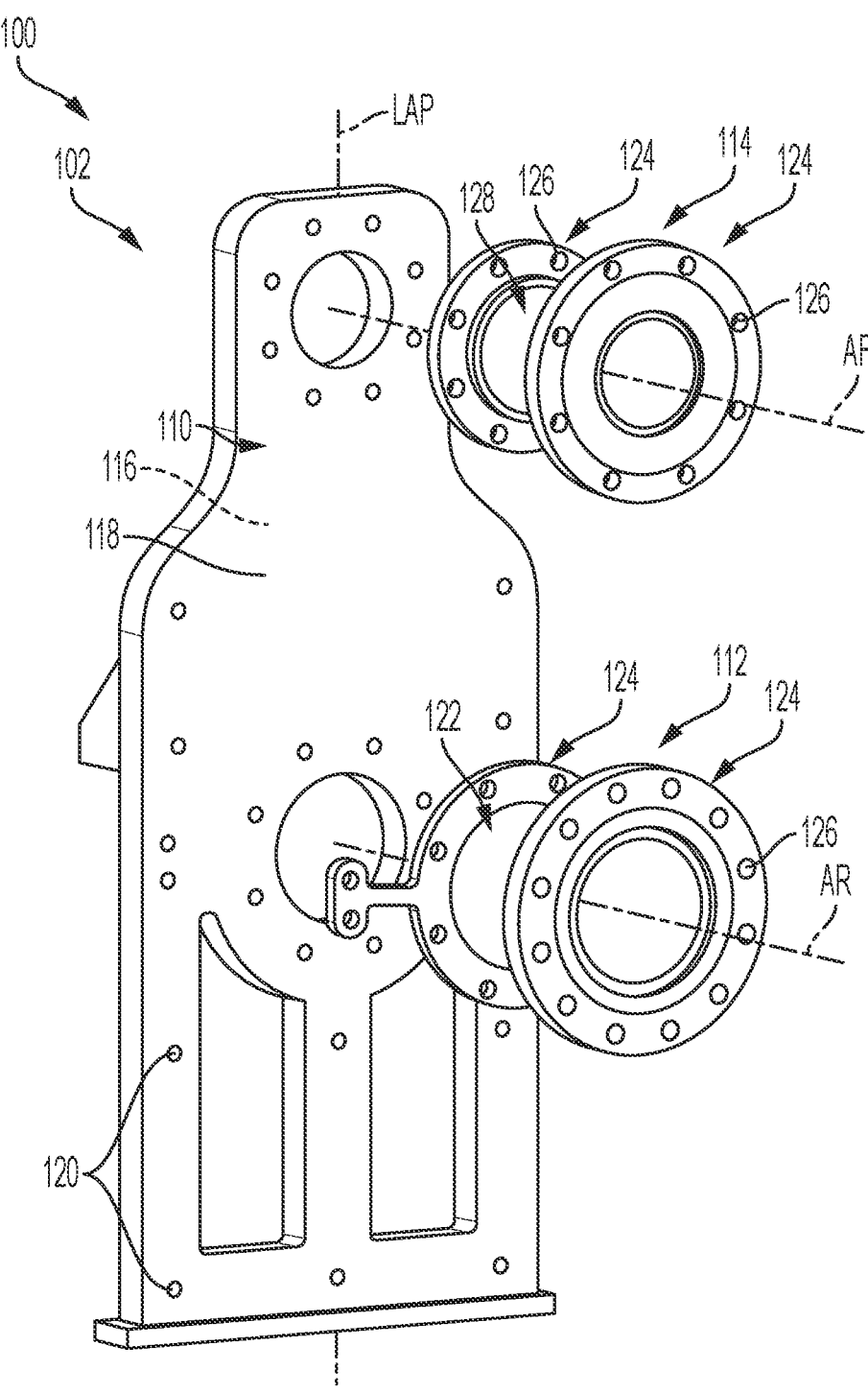
FIG. 3 illustrates a perspective, exploded view of a coupler plate.

FIG. 3 illustrates an exploded view of an exemplary embodiment of a coupler plate 102 (e.g., swivel plate). The coupler plate 102 can be mounted to the side of a vessel 10 such that it can support the upper attachment portion 104, as illustrated for example in FIGS. 1A-1B. The coupler plate 102 can include plate 110, a rotatable coupler 112 (e.g., swivel coupler), and a rigid coupler 114, as illustrated in FIG. 3. The coupler plate 102 can be constructed of metal (e.g., aluminum, stainless steel, etc.). In some embodiments, the plate 110 and the rigid coupler 114 are constructed of aluminum and the rotatable coupler 112 is constructed of stainless steel. Additionally, the coupler plate 102 can be galvanized (e.g., hot-dip galvanized) for corrosion protection.

The plate 110 can define an inner surface 116, an outer surface 118 and a longitudinal axis LAP. In some examples, the plate 110 can be planar. For example, the planar inner surface 116 can be parallel to the planar outer surface 118. The distance between the inner surface 116 and the outer surface 118 can define a thickness of the plate 110. In some embodiments, the plate 110 can be symmetric about a plane extending through its longitudinal axis LAP.

The plate 110 can be mounted, directly or indirectly, to the vessel 10 such that the inner surface 116 faces inward to the vessel 10 and the outer surface 118 faces outward from the vessel 10. When the plate 110 is mounted to the vessel 10, the position of the plate 110 is fixed with respect to the vessel 10. In other words, the plate 110 is inhibited from rotation and translation (e.g., substantially vertical movement, substantially horizontal movement) with respect to the vessel 10.

The plate 110 can include two or more apertures 120 extending through its thickness (e.g., from the inner surface 116 to the outer surface 118) and configured to receive a fastener (e.g., bolt) therethrough. Two or more fasteners can be advanced through two or more apertures 120, respectively, and each fastener can be tightened to removably couple the plate 110 to the vessel 10, directly or indirectly. In some embodiments, the plate 110 can be removably coupled to the vessel 10 directly. In other words, the inner surface 116 of the plate 110 abuts the vessel 10. In other embodiments, the plate 110 can be removably coupled to the vessel 10 indirectly. For example, the plate 110 can be removably coupled to a davit 101 that is coupled to the side of the vessel 10, as illustrated for example in FIGS. 1A-1B. In other examples, the plate 110 can be removably coupled to a support plate 801 that is coupled to the side of the vessel 10, as illustrated for example in FIG. 8A. For example, the support plate 801 can include two or more apertures that substantially align with the apertures 120 of the plate 110. The support plate 801 can be welded to the vessel 10 and then the plate 110 can be removably coupled to the support plate 801 with two or more fasteners.

Figure 4:
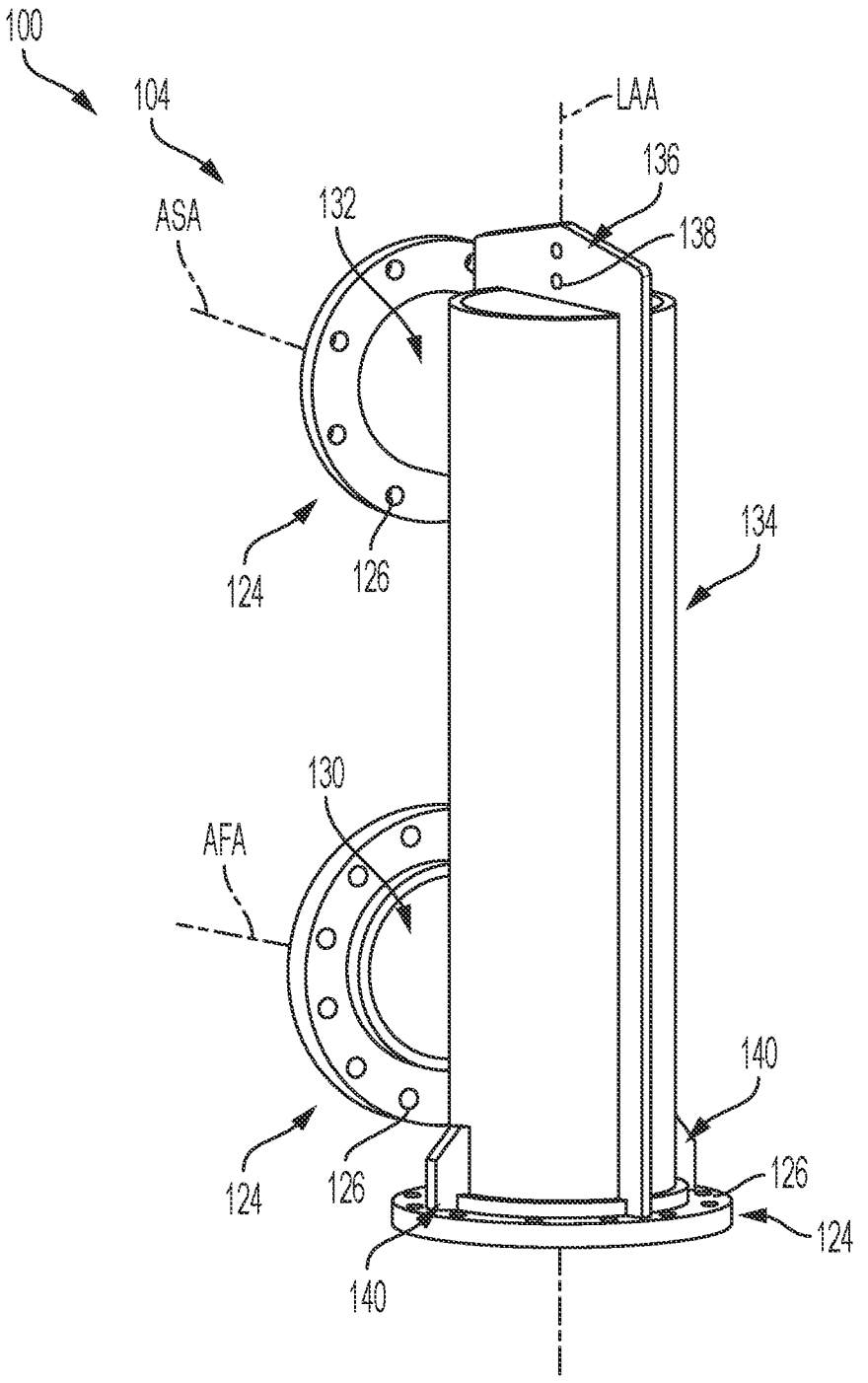
FIG. 4 illustrates a perspective view of an upper attachment portion.

Continuing in the description FIG. 3, the rotatable coupler 112 includes a body 122 that defines an axis of rotation AR (e.g., the longitudinal axis of the body 122). In some embodiments, the body 122 is cylindrically shaped (e.g., a pipe). For example, the body 122 can be a hollow pipe, which can include internal cross-bracing. For example, the internal cross-bracing can be implemented using at least a first and a second internal cross-bracing member, wherein the first internal cross-bracing member is substantially parallel to the second internal cross-bracing member. The length of some (or all) of the internal cross-bracing members can be the same as the internal diameter of the hollow pipe comprising body 122 (e.g., the distal ends of the internal cross-bracing members can be coupled to the inner surface of the hollow pipe comprising body 122). A first end of the body 122 can be coupled (e.g., removably coupled) to the plate 110, such that the body 122 extends outwards therefrom. A second end of the body 122 of the rotatable coupler 112 can be coupled (e.g., removably coupled) to the upper attachment portion 104 (as illustrated in FIG. 4). When the apparatus 100 is assembled, as illustrated for example in FIGS. 1A-1B, the rotatable coupler 112 rotatably couples the coupler plate 102 to the upper attachment portion 104.

A flange connector 124 can be included at each end of the body 122 of the rotatable coupler 112. Each flange connector 124 can include two or more apertures 126 extending through its thickness, and each aperture 126 can be configured to receive a fastener (e.g., bolt) therethrough to removably couple the flange connector 124 to another component of the apparatus 100 (e.g., another flange connector 124). For example, the flange connector 124 at the first end of the body 122 can be coupled (e.g., removably coupled) to the plate 110, thereby removably coupling the rotatable coupler 112 to the plate 110. The flange connector 124 at the second end of the body 122 can be coupled (e.g., removably coupled) to the first pipe attachment 130 (as illustrated for example in FIG. 4), thereby removably coupling the rotatable coupler 112 to the upper attachment portion 104.

The rotatable coupler 112 is configured to rotate about its axis of rotation AR. For example, the rotatable coupler 112 can include one or more bearings such that it can rotate. When the rotatable coupler 112 of the coupler plate 102 (as illustrated in FIG. 3) is coupled to the first pipe attachment 130 of the upper attachment portion 104 (as illustrated in FIG. 4), the axis of rotation AR of the rotatable coupler 112 is coincident with the axis of the first attachment AFA of the first pipe attachment 130. Therefore, the first pipe attachment 130 rotates about its axis of first attachment AFA when the rotatable coupler 112 rotates about its axis of rotation AR. In other words, the coupler plate 102 is rotatably coupled to the upper attachment portion 104, such that rotation of the rotatable coupler 112 corresponds to rotation of the first pipe attachment 130.

When the apparatus 100 is assembled and the coupler plate 102 is coupled to a vessel 10, rotation of the rotatable coupler 112 about its axis of rotation AR corresponds to rotation of the upper attachment portion 104 with respect to the plate 110 such that the apparatus 100 can transition between its different positions (e.g., stowed, deployed). For example, rotation of the rotatable coupler 112 about its axis of rotation AR can cause the apparatus 100 to transition from its stowed position to its deployed position. Similarly, rotation of the rotatable coupler 112 about its axis of rotation AR can cause the apparatus 100 to transition from its deployed position to its stowed position.

In some embodiments, the axis of rotation AR of the rotatable coupler 112 is substantially perpendicular to the longitudinal axis LAP of the plate 110. In some embodiments, when the apparatus 100 is assembled, the longitudinal axis LAP of the plate 110 (as illustrated in FIG. 3) is substantially parallel to the longitudinal axis LAA of the upper attachment portion 104 (as illustrated in FIG. 4). Therefore, the axis of rotation AR of the rotatable coupler 112 can be substantially perpendicular to the longitudinal axis LAA of the upper attachment portion 104. Moreover, the axis of rotation AR of the rotatable coupler 112 can be substantially perpendicular to the longitudinal axis of the apparatus 100.

Continuing with FIG. 3, the rigid coupler 114 includes a body 128 that defines an axis of fixation AF (e.g., the longitudinal axis of the body 128). In some embodiments, the body 128 is cylindrically shaped (e.g., a pipe). For example, the body 128 can be a hollow pipe, which can include internal cross-bracing. In some aspects, the internal cross-bracing included in the body 128 can be the same as or similar to the internal cross-bracing described above with respect to the body 122. The first end of the body 128 can be coupled (e.g., removably coupled) to the plate 110, such that the body 128 extends outwards therefrom. To inhibit rotation of the apparatus 100 about the rotatable coupler 112, the second end of the body 128 of the rigid coupler 114 (as illustrated in FIG. 3) can be coupled (e.g., removably coupled) to the second pipe attachment 132 of the upper attachment portion 104 (as illustrated in FIG. 4).

When the apparatus 100 is assembled, the apparatus 100 can be rotated into its deployed position, as illustrated in FIG. 1B. Then, the rigid coupler 114 can be coupled to the second pipe attachment 132 to inhibit rotation of the apparatus 100 about the rotatable coupler 112. In this manner, the apparatus 100 can be used to perform a survey. After the survey is complete, the rigid coupler 114 can be uncoupled from the second pipe attachment 132, such that the apparatus 100 can rotate about the rotatable coupler 112 and transition to its stowed position, as illustrated in FIG. 1A.

A flange connector 124 can be included at each end of the body 128 of the rigid coupler 114. For example, the flange connector 124 at the first end of the body 128 can be coupled (e.g., removably coupled) to the plate 110, thereby removably coupling the rigid coupler 114 to the coupler plate 102. When the apparatus 100 is in its deployed position, as previously discussed, the flange connector 124 at the second end of the body 128 can be removably coupled to the second pipe attachment 132, thereby removably coupling the rigid coupler 114 to the upper attachment portion 104 and inhibiting rotation of the apparatus 100 about the rotatable coupler 112.

The rigid coupler 114 is configured to couple (e.g., removably couple) the coupler plate 102 to the upper attachment portion 104 to inhibit rotation of the upper attachment portion 104 about the rotatable coupler 112. When the rigid coupler 114 (as illustrated in FIG. 3) is coupled to the second pipe attachment 132 (as illustrated in FIG. 4), the axis of fixation AF is coincident with the axis of the second attachment ASA. When the apparatus 100 is assembled and the plate 110 is coupled to the vessel 10, transitioning the apparatus to its deployed position and coupling the rigid coupler 114 to the second pipe attachment 132 of the upper attachment portion 104 inhibits rotation of the apparatus 100 as it moves through the water to perform a survey. In other words, the rigid coupler 114 counteracts the forces that the water imparts on the apparatus 100 when it is deployed and the vessel 10 is moving through the water.

In some embodiments, a plane extending through both the axis of rotation AR of the rotatable coupler 112 and the axis of fixation AF of the rigid coupler 114 is substantially vertical when the rigid coupler 114 couples the coupler plate 102 to the upper attachment portion 104. In this manner, the apparatus 100 can be substantially vertical in its deployed position.

FIG. 4 illustrates an exemplary embodiment of an upper attachment portion 104 (e.g., which may be provided as an F-pipe). As discussed previously, the upper attachment portion 104 is rotatably coupled to the rotatable coupler 112 of the coupler plate 102 such that it can rotate with respect to the coupler plate (e.g., transition between its stowed position and its deployed position). Additionally, the upper attachment portion 104 can be removably coupled to the rigid coupler 114 of the coupler plate 102 to inhibit rotation of the upper attachment portion 104 (e.g., to maintain the apparatus 100 in its deployed position). Additionally, the upper attachment portion 104 can support the winged pipe segment 106, as illustrated for example in FIGS. 1A-1B. The upper attachment portion 104 can include a first pipe attachment 130 and a second pipe attachment 132. The upper attachment portion 104 can be constructed of metal (e.g., aluminum). Additionally, the upper attachment portion 104 can be galvanized (e.g., hot-dip galvanized) for corrosion protection.

The upper attachment portion 104 includes a body 134 that defines a longitudinal axis LAA. In some embodiments, the body 134 is cylindrically shaped (e.g., a pipe). For example, the body 134 can be a hollow pipe, which can include internal cross-bracing. In some embodiments, the first end of the body 134 can include a plate 136 extending outward from the body 134. The plate 136 can have one or more apertures 138 extending therethrough, such that the plate 136 and/or apertures 138 can connect to equipment (e.g., such as a utility hook) that can be used to hoist or otherwise position the upper attachment portion 104, such as during assembly of the apparatus 100. The body 134 extends to a second end, which can be coupled (e.g., removably coupled) to the winged pipe segment 106. A flange connector 124 can be included at the second end of the body 134 to removably couple the second end of the body 134 of the upper attachment portion 104 to the winged pipe segment 106. In some embodiments, one or more gusset plates 140 can strengthen the connection between the second end of the body 134 and the flange connector 124.

Continuing with FIG. 4, the first pipe attachment 130 extends laterally outward from the body 134 and defines an axis of the first attachment AFA (e.g., longitudinal axis of the first pipe attachment 130). In some embodiments, the first pipe attachment 130 is cylindrically shaped (e.g., a pipe). For example, the first pipe attachment 130 can be a hollow pipe, which can include internal cross-bracing.

The first pipe attachment 130 of the upper attachment portion 104 (as illustrated in FIG. 4) can be coupled (e.g., removably coupled) to the rotatable coupler 112 of the coupler plate 102 (as illustrated in FIG. 3), such that the upper attachment portion 104 can rotate in conjunction with rotation of the rotatable coupler 112. In other words, the first pipe attachment 130 is rotatably coupled to the rotatable coupler 112. A flange connector 124 can be included at the second end of the first pipe attachment 130 such that the flange connector 124 can be coupled to the rotatable coupler 112, thereby coupling the upper attachment portion 104 to the coupler plate 102.

The first pipe attachment 130 can rotate about its axis of the first attachment AFA. When the first pipe attachment 130 (as illustrated in FIG. 4) is coupled (e.g., removably coupled) to the rotatable coupler 112 (as illustrated in FIG. 3), the axis of the first attachment AFA is coincident with the axis of rotation AR. Thus, because they are rotatably coupled, the first pipe attachment 130 rotates about its axis of the first attachment AFA when the rotatable coupler 112 rotates about its axis of rotation AR. In this manner, the first pipe attachment 130 can rotate about its axis of the first attachment AFA to transition the apparatus 100 between its different positions (e.g., stowed, deployed), as illustrated for example in FIGS. 1A-1B.

In some embodiments, the axis of the first attachment AFA is substantially orthogonal to the longitudinal axis LAA of the upper attachment portion 104. In some embodiments, when the apparatus 100 is assembled, the longitudinal axis LAA of the upper attachment portion 104 (as illustrated in FIG. 4) is substantially parallel to the longitudinal axis LAP of the plate 110 (as illustrated in FIG. 3). Therefore, the axis of the first attachment AFA can be substantially orthogonal to the longitudinal axis of the apparatus 100.

Continuing with FIG. 4, the second pipe attachment 132 extends laterally outward from the body 134 and defines an axis of the second attachment ASA (e.g., longitudinal axis of the second pipe attachment 132). In some embodiments, the second pipe attachment 132 is cylindrically shaped (e.g., a pipe). For example, the second pipe attachment 132 can be a hollow pipe, which can include internal cross-bracing.

The second pipe attachment 132 of the upper attachment portion 104 (as illustrated in FIG. 4) can be removably coupled to the rigid coupler 114 of the coupler plate 102 (as illustrated in FIG. 3) to inhibit rotation of the upper attachment portion 104 about the rotatable coupler 112, such as when the apparatus 100 is in its deployed position. In other words, when the apparatus 100 is in its deployed position, the second pipe attachment 132 can be removably coupled to the rigid coupler 114 to inhibit rotation of the rotatable coupler 112. Subsequently, the second pipe attachment 132 can be uncoupled from the rigid coupler 114 such that the rotatable coupler 112 can rotate to transition the apparatus 100 to its stowed position. A flange connector 124 can be included at the second end of the second pipe attachment 132 such that the flange connector 124 can be coupled (e.g., removably coupled) to the rigid coupler 114, thereby removably coupling the upper attachment portion 104 to the coupler plate 102.

When the second pipe attachment 132 (as illustrated in FIG. 4) is removably coupled to the rigid coupler 114 (as illustrated in FIG. 3), the axis of the second attachment ASA is coincident with the axis of fixation AF. In this manner, when the second pipe attachment 132 is removably coupled to the rigid coupler 114, both rotation of the first pipe attachment 130 about its axis of the first attachment AFA and rotation of the rotatable coupler 112 about is axis of rotation AR are inhibited. Thus, when the apparatus 100 is deployed to perform a survey, both the rotatable coupler 112 and the rigid coupler 114 couple the upper attachment portion 104 to the coupler plate 102 to inhibit translation and rotation of the apparatus 100 with respect to the vessel 10.

In some embodiments, the axis of the second attachment ASA is substantially orthogonal to the longitudinal axis LAA of the upper attachment portion 104. In some embodiments, when the apparatus 100 is assembled, the longitudinal axis LAA of the upper attachment portion 104 (as illustrated in FIG. 4) is substantially parallel to the longitudinal axis LAP of the plate 110 (as illustrated in FIG. 3). Therefore, the axis of the second attachment ASA can be substantially orthogonal to the longitudinal axis LAP of the plate 110. Moreover, the axis of the second attachment ASA can be substantially orthogonal to the longitudinal axis of the apparatus 100.

Figure 5:
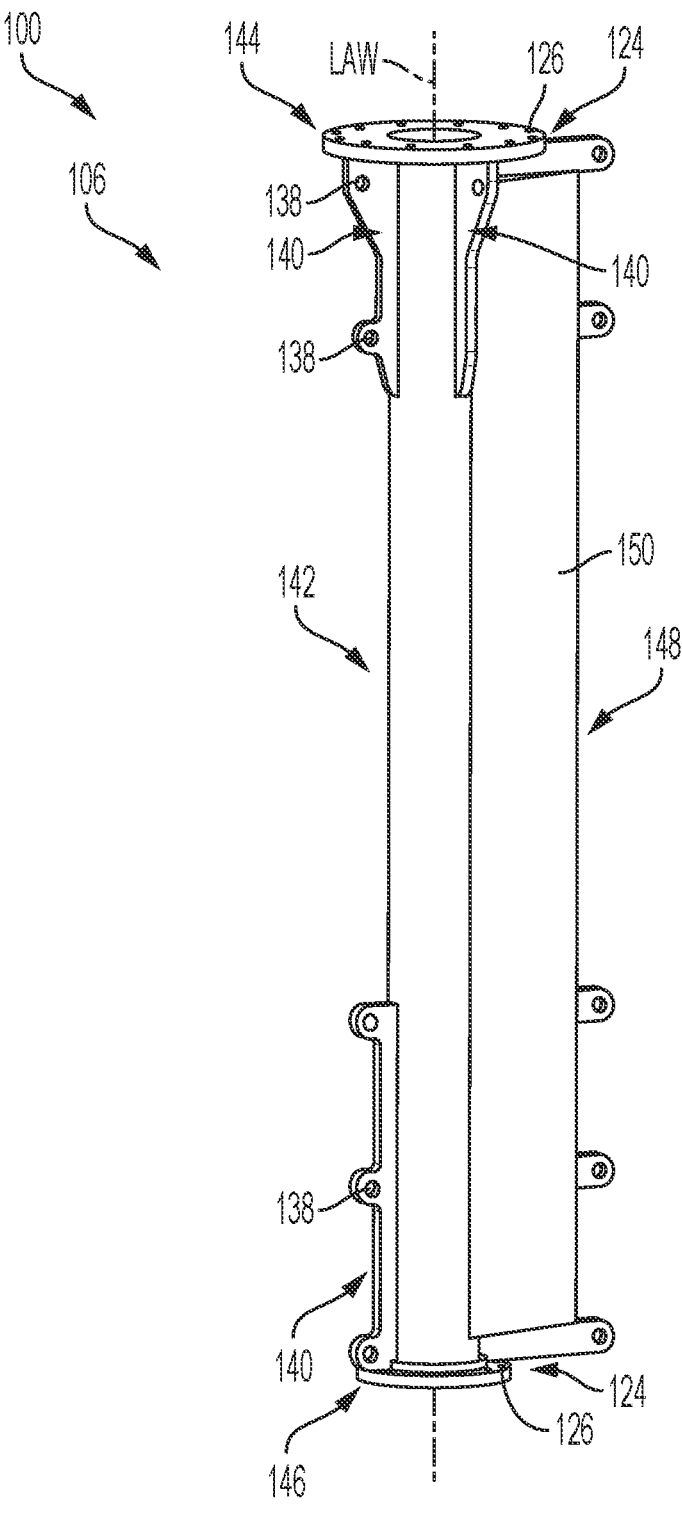
FIG. 5 illustrates a perspective view of a winged pipe segment.

FIG. 5 illustrates an exemplary embodiment of a winged pipe segment 106. The winged pipe segment 106 is coupled (e.g., removably coupled) to the upper attachment portion 104 and also coupled (e.g., removably coupled) to the sensor array portion 108. In other words, the winged pipe segment 106 is coupled between the upper attachment portion 104 and the sensor array portion 108, thereby connecting the sensor array portion 108 to the upper attachment portion 104. The winged pipe segment 106 can be constructed of metal (e.g., aluminum). Additionally, the winged pipe segment 106 can be galvanized (e.g., hot-dip galvanized) for corrosion protection.

One or more winged pipe segments 106 can be included in the sensor acquisition apparatus 100. For example, the apparatus 100 can include one winged pipe segment 106, as illustrated in FIGS. 1A-1B, 2, and 5. In other examples, the apparatus 100 can include at least two winged pipe segments 106 (e.g., 106*a*, 106*b*), as illustrated for example in FIGS. 7A-7B. In still other examples, the apparatus 100 can include at least three winged pipe segments 106 (e.g., 106*a*, 106*b*, 106*c*), as illustrated for example in FIGS. 8A-8C. In still other examples, the apparatus 100 can include four or more winged pipe segments 106. When two or more winged pipe segments 106 are included in the apparatus 100, each of the respective winged pipe segments 106 are coupled together to form a winged pipe portion, which is itself coupled between the upper attachment portion 104 and the sensor array portion 108, thereby connecting the sensor array portion 108 to the upper attachment portion 104. For example, an upper winged pipe segment (of the winged pipe portion) can be coupled to the upper attachment portion 104, and a lower winged pipe segment (of the same winged pipe portion) can be coupled to the sensor array portion 108.

Each winged pipe segment 106 includes a body 142 extending from a first end 144 to a second end 146 and defining a longitudinal axis LAW. The distance between the first end 144 and the second end 146 defines a length of the winged pipe segment 106. The length of the winged pipe segment 106 can be, for example, approximately 2.5-feet, approximately 5-feet, approximately 7.5-feet, or approximately 10-feet. In some examples, the length of the winged pipe segment 106 can be greater than 10-feet. In some examples, when more than one winged pipe segment 106 is included in the apparatus, the length of each winged pipe segment 106 (e.g., 106*a*, 106*b*, 106*c*) can be uniform, as illustrated for example in FIGS. 8A-8B. In other examples, the length of each winged pipe segment 106 (e.g., 106*a*, 106*b*) can vary, as illustrated for example in FIGS. 7A-7B. In some embodiments, the body 142 is cylindrically shaped (e.g., a pipe). For example, the body 142 can be a hollow pipe (e.g., hollow pipe segment), which can include internal cross-bracing (e.g., which may be the same as or similar to the internal cross-bracing described above with respect to the body 122). When the winged pipe segment 106 is coupled to the upper attachment portion 104, the longitudinal axis LAW of the winged pipe segment 106 (as illustrated in FIG. 5) can be coincident with the longitudinal axis LAA of the upper attachment portion 104 (as illustrated in FIG. 4). In some examples, the longitudinal axis LAW of the winged pipe segment 106 can be parallel to the longitudinal axis of the apparatus 100. In some examples, the winged pipe segment 106 is symmetric about a plane extending through the longitudinal axis LAW of the winged pipe segment 106.

A flange connector 124 can be included at each end 144, 146 of the body 142 of the winged pipe segment 106. For example, the flange connector 124 at the first end 144 of the body 142 can be coupled (e.g., removably coupled) to the upper attachment portion 104, thereby coupling the winged pipe segment 106 to the upper attachment portion 104. In some embodiments, one or more gusset plates 140 can strengthen the connection between the first end 144 of the body 142 and the flange connector 124 at the first end 144. Moreover, one or more gusset plates 140 can strengthen the connection between the second end 146 of the body 142 and the flange connector 124 at the second end 146. Each gusset plate 140 can have one or more apertures 138 extending therethrough, such that the gusset plate 140 and/or apertures

138 can connect to equipment (e.g., utility hook) that can be used to hoist or otherwise position the winged pipe segment 106.

When the apparatus 100 includes one winged pipe segment 106, the first end 144 of the body 142 of the winged pipe segment 106 can be coupled (e.g., removably coupled) to the upper attachment portion 104 and the second end 146 of the body 142 of the winged pipe segment 106 can be coupled (e.g., removably coupled) to the sensor array portion 108. When the winged pipe segment (as illustrated in FIG. 5) is coupled to the upper attachment portion 104 (as illustrated in FIG. 4), the longitudinal axis LAW of the winged pipe segment 106 is coincident with the longitudinal axis LAA of the upper attachment portion 104.

Figure 7A:
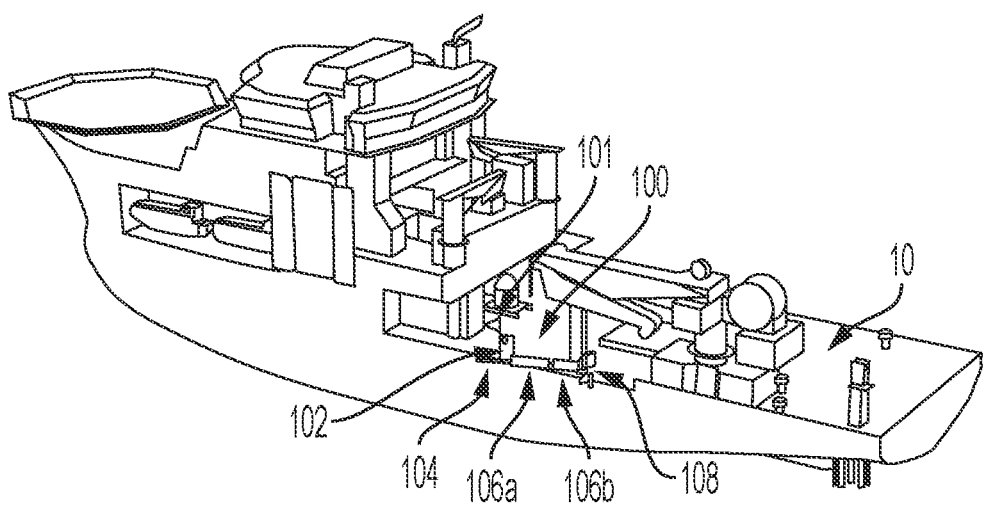
FIGS. 7A-7B illustrate perspective views of a vessel with a sensor acquisition apparatus mounted thereto according to an exemplary embodiment.
Figure 7B:
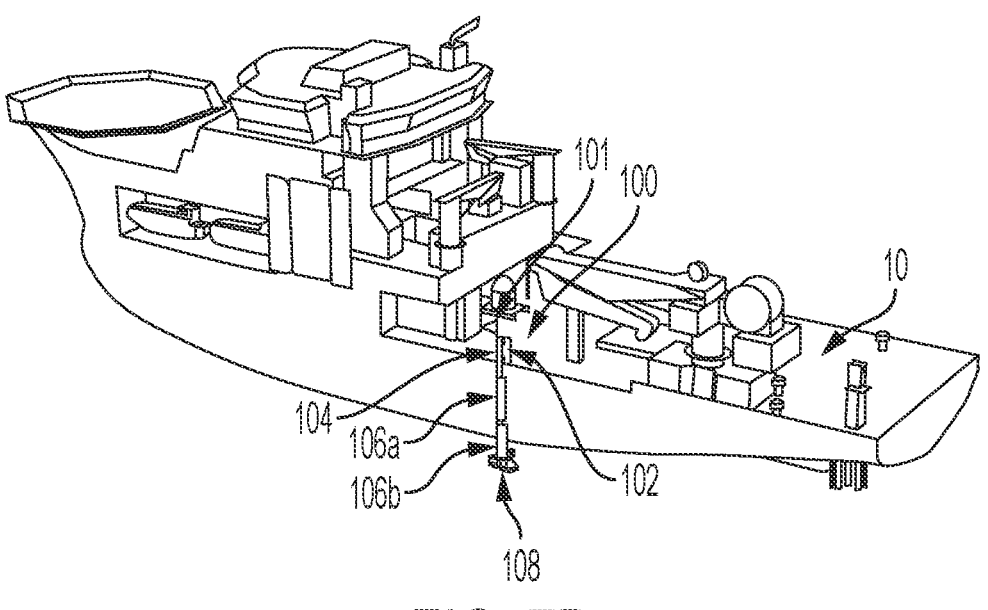

When the apparatus 100 includes two winged pipe segments 106 (e.g., 106*a*, 106*b*), as illustrated for example in FIGS. 7A-7B, the second winged pipe segment 106*b* is coupled between the first winged pipe segment 106*a* and the sensor array portion 108. In other words, because the apparatus 100 is modular, additional winged pipe segments 106 can be added to the apparatus 100. For example, second winged pipe segment 106*b* can be added to the apparatus 100 to extend its length (e.g., survey depth). Similarly, a second winged pipe segment 106*b* can be removed from the apparatus 100 to reduce its length (e.g., survey depth).

Returning to FIG. 5, each winged pipe segment 106 includes a wing portion 148. The wing portion 148 can reduce vibration (e.g., vibration-reducing wing), such as, for example, when the apparatus 100 is deployed and the vessel 10 is moving through the water (e.g., the apparatus 100 is performing a survey). In other words, the wing portion 148 can reduce vortex induced vibrations by stabilizing each winged pipe segment 106 moving through the water.

The wing portion 148 can define surfaces 150 that define an edge (e.g., trailing edge). For example, when the apparatus 100 is in its deployed position, a leading edge (e.g., defined by the body 142 of the winged pipe segment 106) faces towards the bow (i.e., front) of the vessel 10 and the trailing edge (e.g., defined by the surfaces 150 of the wing portion 148 of the winged pipe segment 106) faces towards the stern (i.e., rear) of the vessel 10. The wing portion 148 can be specifically designed (e.g., dimensions of the wing portion 148) based on the size (e.g., diameter) of the body 142 (e.g., pipe), the desired survey speeds (e.g., maximum survey speed, minimum survey speed), and cross track side loading profile to mitigate vortex induced vibrations and maximize laminar water flow. In this manner, when the apparatus 100 is in its deployed position and the vessel 10 is performing a survey, the wing portion 148 mitigates vortex induced vibrations, which could otherwise form on the backside of the winged pipe segment 106 and cause the winged pipe segment 106 to oscillate. In some examples, the wing portion 148 is symmetric about a plane extending through the longitudinal axis LAW of the winged pipe segment 106.

In some embodiments, the wing portion 148 can extend from the first end 144 to the second end 146 of the body 142 of the winged pipe segment 106. In other embodiments, the length of the wing portion 148 can be less than the length of the body 142 of the winged pipe segment 106. In some embodiments, the wing portion 148 can be disposed along an outer surface of the body 142 (e.g., hollow pipe segment). In some embodiments, the wing portion 148 can enclose the outer circumference of the body 142 (e.g., hollow pipe segment).

Figure 6:
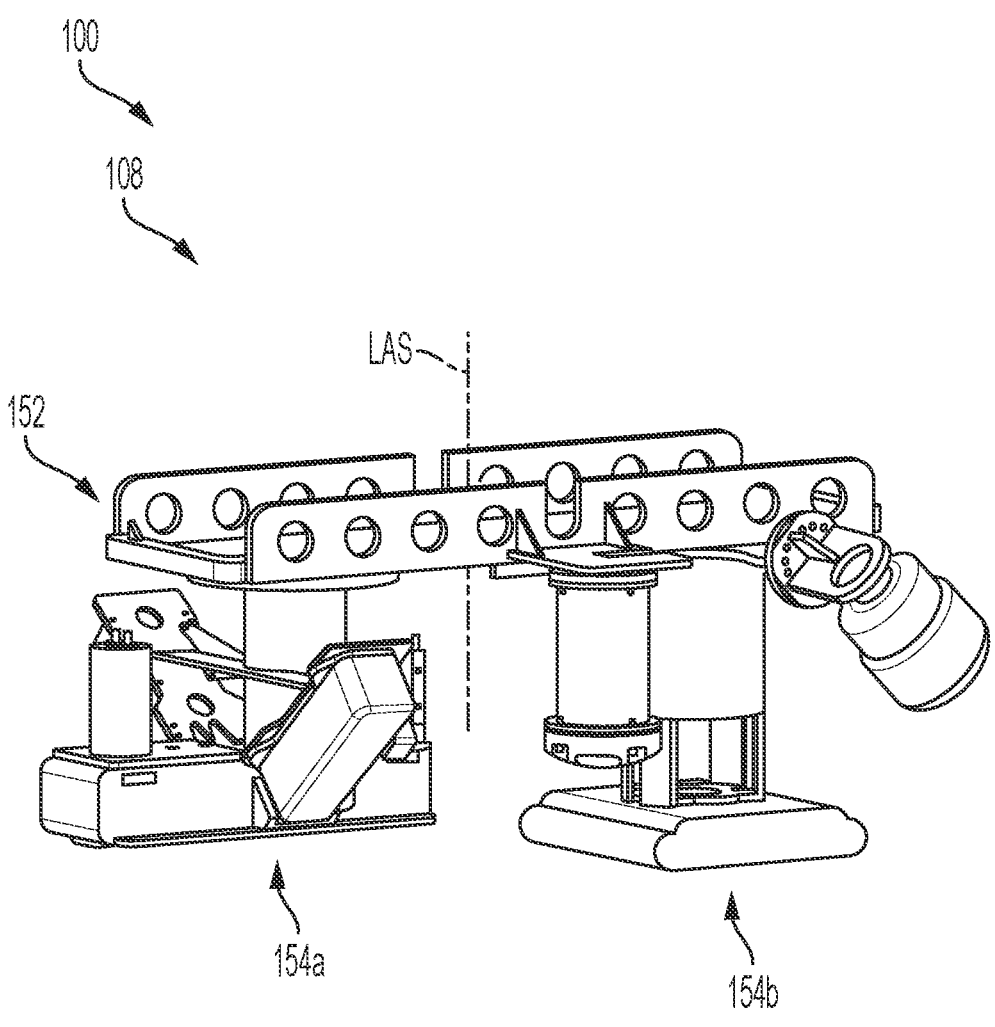
FIG. 6 illustrates a perspective view of a sensor array portion.

FIG. 6 illustrates an exemplary embodiment of a sensor array portion 108 (e.g., sensor gondola). The sensor array portion 108 is coupled (e.g., removably coupled) to the winged pipe segment 106, such that the sensor array portion 108 can perform a survey when the apparatus is deployed. The sensor array portion 108 can be constructed of metal (e.g., aluminum). Additionally, the sensor array portion 108 can be galvanized (e.g., hot-dip galvanized) for corrosion protection.

The sensor array portion 108 includes a frame 152 that defines a longitudinal axis LAS (e.g., longitudinal axis of the sensor array portion 108). The frame 152 of the sensor array portion 108 (as illustrated in FIG. 6) can be coupled (e.g., removably coupled) to the winged pipe segment 106 (as illustrated in FIG. 5). For example, fasteners (e.g., bolts) can connect apertures in the frame 152 to apertures in the gusset plates 140 (or other supporting structures) at the second end 146 of the winged pipe segment 106. In some embodiments, as illustrated for example in FIGS. 8A-8C, the frame 152 can include a flange connector 124 that can be coupled (e.g., removably coupled) to the second end 146 of the body 142 of the winged pipe segment 106 (as illustrated in FIG. 5). When the sensor array portion 108 is coupled to the winged pipe segment 106, the longitudinal axis LAS of the sensor array portion 108 (as illustrated in FIG. 6) can be coincident with the longitudinal axis LAW of the winged pipe segment 106 (as illustrated in FIG. 5).

One or more remote sensing arrays 154 (e.g., 154*a*, 154*b*) can be coupled to the frame 152. Each remote sensing array 154 can be configured to survey the sea floor. In some embodiments, each respective remote sensing array (e.g., of the one or more remote sensing arrays 154) can include at least remote sensor. For example, a remote sensing array can comprise a single remote sensor. In other examples, a remote sensing array can include multiple remote sensors. Because the remote sensing arrays 154 are coupled to the frame 152, the remote sensing arrays 154 are submerged in the water when the apparatus 100 is in the survey position, as illustrated in FIG. 1B. In this manner, the remote sensing arrays 154 of the sensor array portion 108 can perform a survey when the apparatus is in its deployed position.

FIGS. 7A-7B illustrate an exemplary embodiment of the sensor acquisition apparatus 100. As previously discussed, the apparatus 100 includes a first winged pipe segment 106*a* and a second winged pipe segment 106*b*. The second winged pipe segment 106*b* is coupled between the first winged pipe segment 106*a* and the sensor array portion 108. The apparatus 100 can transition between a stowed position (as illustrated in FIG. 7A) and a deployed position (as illustrated in FIG. 7B).

Figure 8A:
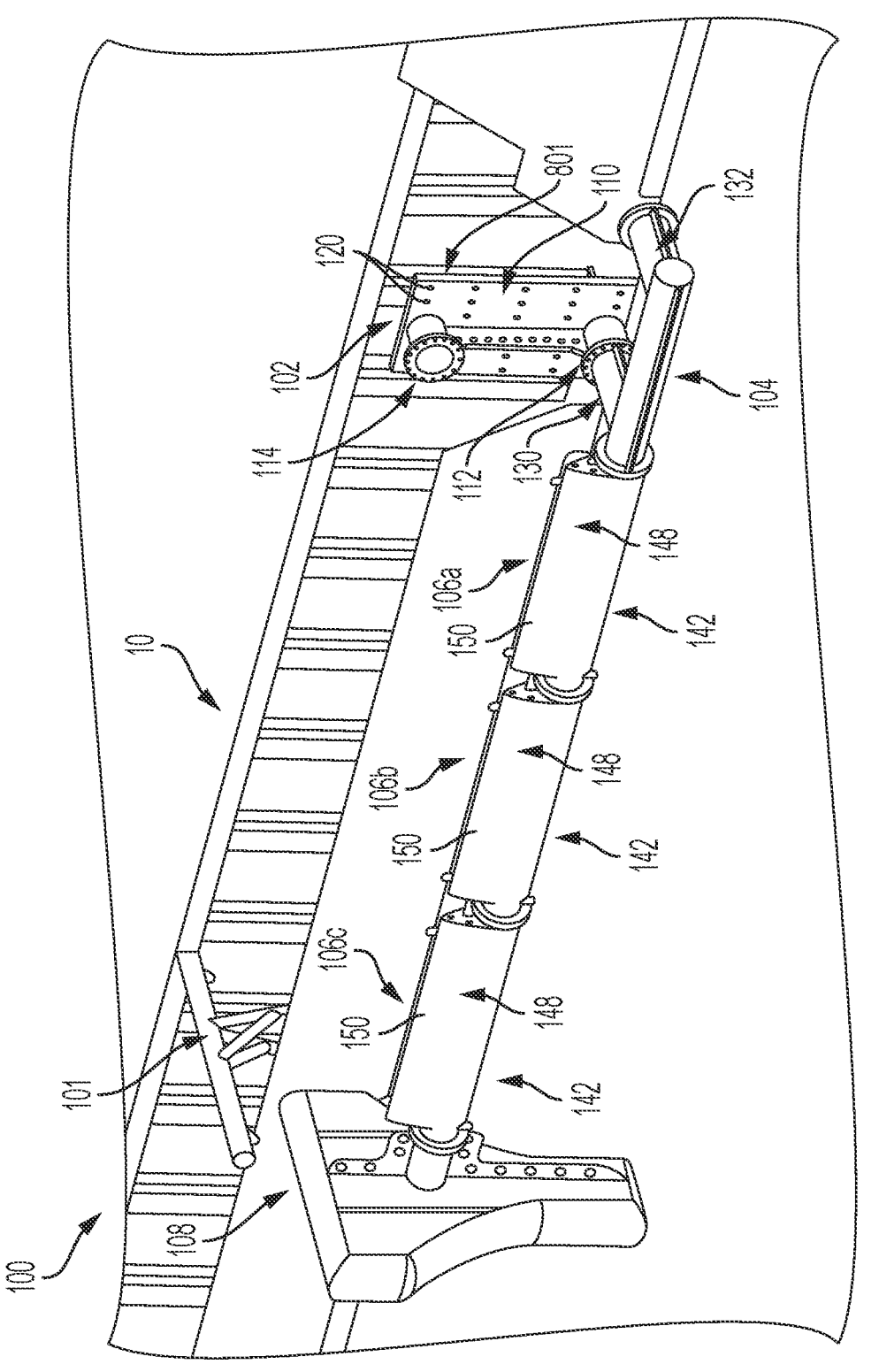
FIGS. 8A-8C illustrate an exemplary embodiment of a sensor acquisition apparatus in its stowed position, intermediate position, and deployed position, respectively, according to an exemplary embodiment.
Figure 8B:
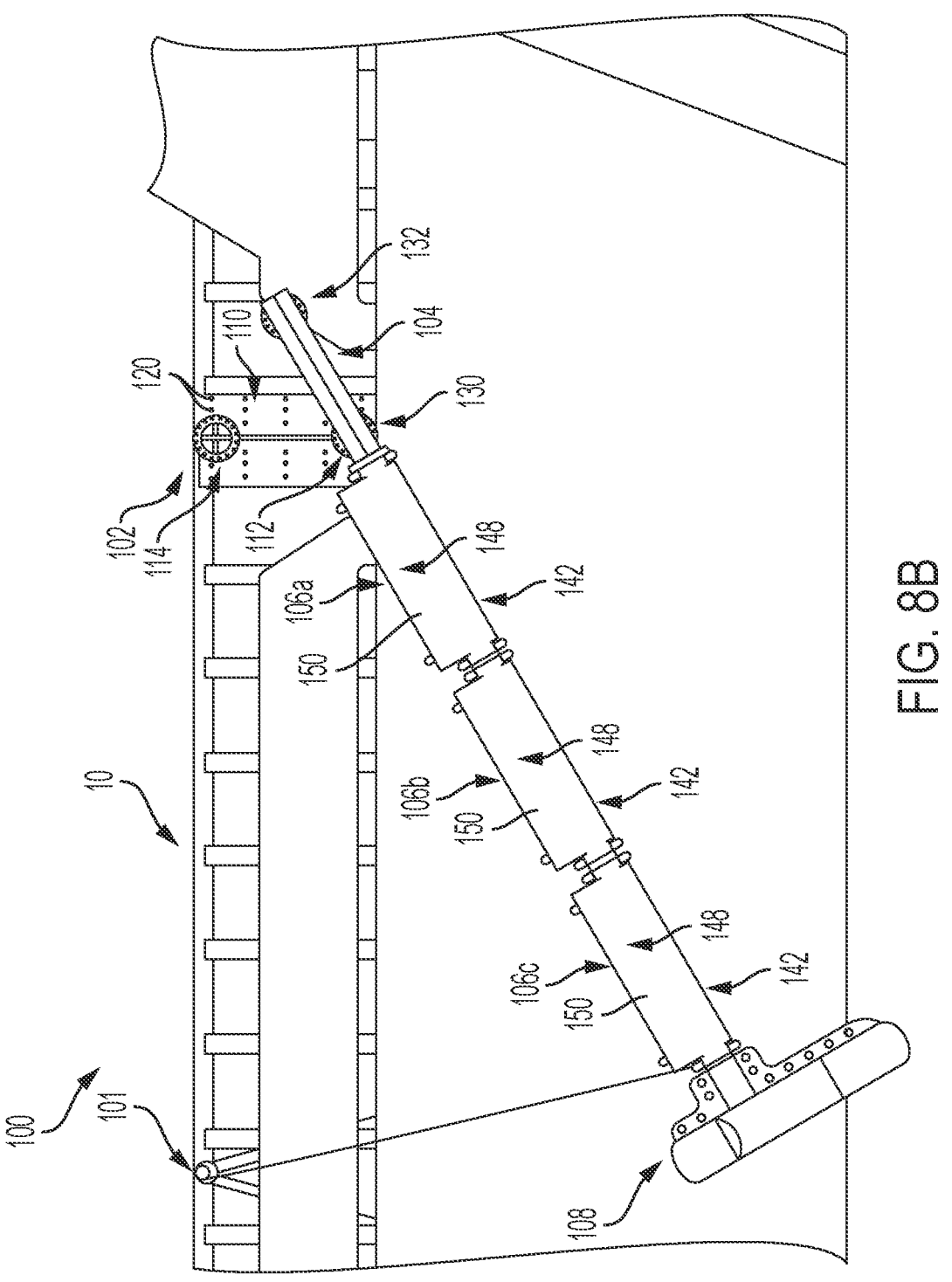
Figure 8C:
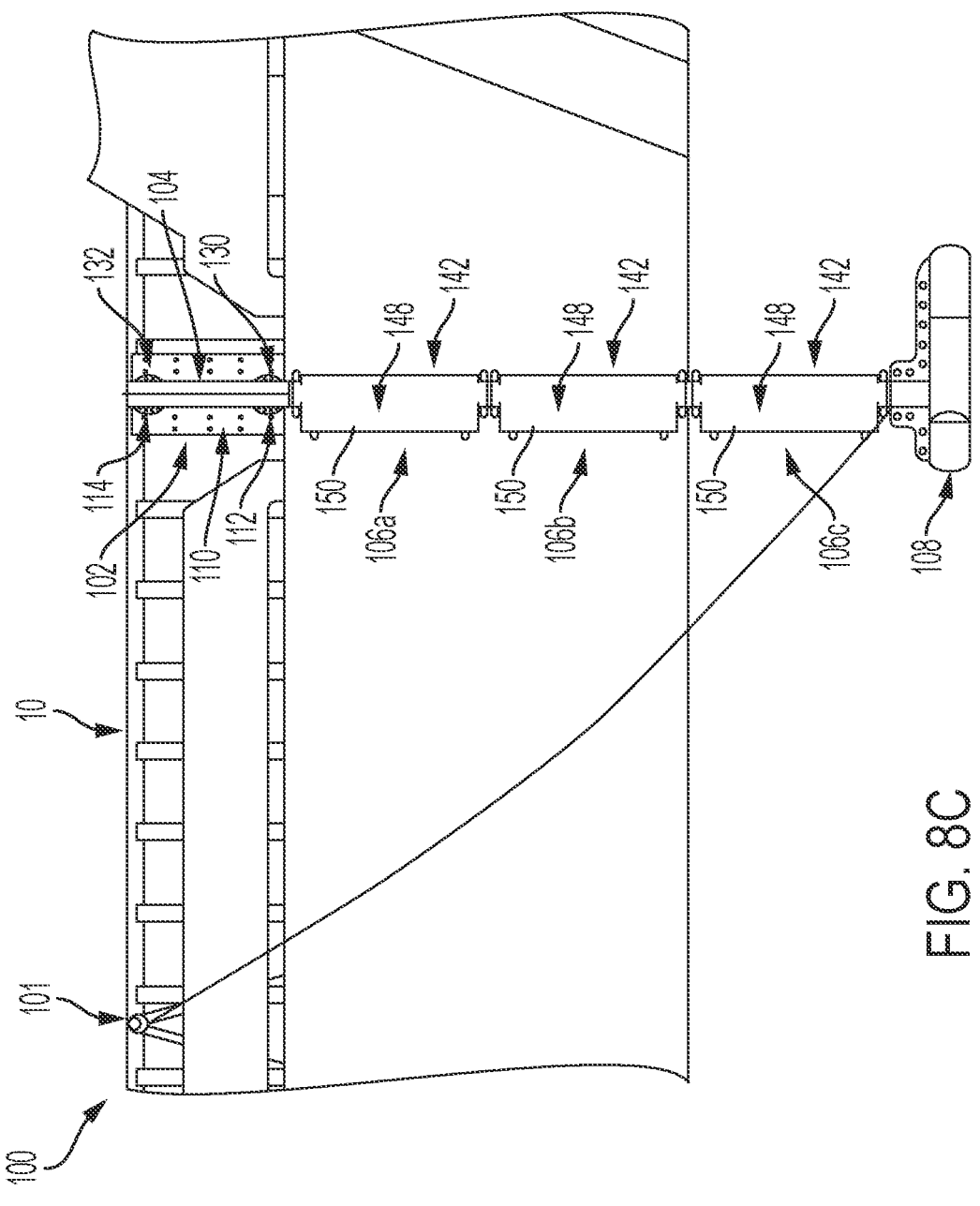

FIGS. 8A-8C illustrate an exemplary embodiment of the sensor acquisition apparatus 100. The apparatus includes a first winged pipe segment 106*a*, a second winged pipe segment 106*b*, and a third winged pipe segment 106*c*. The third winged pipe segment 106*c* is coupled between the second winged pipe segment 106*b* and the sensor array portion 108. The apparatus 100 can transition between a stowed position (FIG. 8A), an intermediate position (FIG. 8B), and a deployed position (FIG. 8C). For example, when the apparatus 100 is in its transit position along the side of a vessel 10, the apparatus 100 can be rotated into its deployed position (e.g., survey mode). Similarly, when the apparatus is in its deployed position along the side of a vessel 10, the apparatus 100 can be rotated into its stowed position.

The apparatus 100 can transition from its stowed position to its deployed position, such that the apparatus 100 can perform a survey. As illustrated in FIG. 8A, the apparatus 100 can be in its stowed position, which can be a substantially horizontal orientation along the side of a vessel 10. A winch (e.g., utility hook), which is connected to a davit 101, can be connected to a winged pipe segment 106 and retracted to maintain the apparatus 100 in its stowed position. As illustrated in FIG. 8B, the winch can be released, thereby causing the upper attachment portion 104 to rotate about its first pipe attachment 130, which is rotatably coupled to the rotatable coupler 112 of the coupler plate 102. The upper attachment portion 104 can rotate until the second pipe attachment 132 of the upper attachment portion 104 is aligned with the rigid coupler 114 of the coupler plate 102. As illustrated in FIG. 8C, the rigid coupler 114 can be removably coupled to the second pipe attachment 132, such that rotation of the upper attachment portion 104 is inhibited. Then, with the apparatus 100 in its deployed position (e.g., sensor array portion 108 submerged in the water), the vessel 10 can advance to perform a survey.

The apparatus 100 can transition from its deployed position to its stowed position, such that the apparatus is ready for transit. As illustrated in FIG. 8C, the apparatus 100 can be in its deployed position, which can be a substantially vertical orientation along the side of a vessel 10. Then, the second pipe attachment 132 of the upper attachment portion 104 can be uncoupled from the rigid coupler 114 of the coupler plate 102. After the second pipe attachment 132 is uncoupled from the rigid coupler 114, the upper attachment portion 104 can rotate about its first pipe attachment 130, which is rotatably coupled to the rotatable coupler 112 of the coupler plate 102. As illustrated in FIG. 8B, a winch (e.g., utility hook), which is connected to a davit 101, can be connected to a winged pipe segment 106 and retracted such that the apparatus 100 rotates towards its stowed position. As illustrated in FIG. 8A, the winch can continue to retract until the apparatus 100 is in its stowed position. The winch can maintain the position of the apparatus 100 in its stowed position.

EXAMPLES

As described above, the apparatus can 100 can be configured to mob to any vessel 10 with any type of remote sensor. In other words, because the apparatus is modular it can be configured for specific applications. For example, the apparatus 100 can include various pipe diameters for the body 122 of the rotatable coupler 112, the body 128 of the rigid coupler 114, the first pipe attachment 130 of the upper attachment portion 104, the second pipe attachment 132 of the upper attachment portion 104, the body 134 of the upper attachment portion, and/or the body 142 of the winged pipe segment 106. For example, the diameter of the pipe can vary between 6-inch diameter and 16-inch diameter in accordance with the depth of the survey. In other words, a larger diameter pipe can be used for a deeper survey.

Example 1-6-Inch Diameter Pipe

Approximately 6-inch diameter pipe can be mobbed onto a vessel, as illustrated for example in FIGS. 1A-1B. The apparatus 100 can weigh approximately 900 pounds. The vessel can be between 20-feet and 80-feet in length. In some examples, the apparatus 100 can operate in sea stated up to 1.5 meters. Additionally, the apparatus 100 can be used on any draft vessel up to 6-feet. For example, the modular vertical pipe sections can support approximately 2.5-foot sections and 5-foot sections.

The apparatus 100 can perform shallow water mapping of the seafloor and/or water column on a small vessel of opportunity in a foreign country or cable route surveys at both high (e.g., greater than 7 knots) and low (e.g., less than 7 knots) speeds. The apparatus 100 can be rated for remote sensing payloads up to 1,000 pounds, such as multibeams, subbottom profilers, and gondolas. In some examples, the apparatus 100 can be used for water depth up to 100 meters.

Example 2-10-Inch Diameter Pipe

Approximately 10-inch diameter pipe can be mobbed onto a vessel, as illustrated for example in FIGS. 7A-7B. The apparatus 100 can weigh approximately 6,000 pounds. In some examples, the apparatus 100 can operate in sea stated up to 2.5 meters. Additionally, the apparatus 100 can be used on any draft vessel up to 22-feet. For example, the modular vertical pipe sections can support approximately 2.5-foot sections, 5-foot sections, and 10-foot sections.

The apparatus 100 can be used for full ocean depth mapping of the seafloor and/or water column on a vessel of opportunity in a foreign country or cable route surveys at both high (e.g., greater than 7 knots) and low (e.g., less than 7 knots) speeds. The apparatus 100 can be rated for remote sensing payloads up to 2,500 pounds, such as multibeams, subbottom profilers, and gondolas. In some examples, the apparatus 100 can be used for water depth up to 1,000 meters.

Example 3-16-Inch Diameter Pipe

Approximately 16-inch diameter pipe can be mobbed onto a vessel, as illustrated for example in FIGS. 8A-8C. The apparatus 100 can weigh approximately 16,000 pounds. In some examples, the apparatus 100 can operate in sea stated up to 2.5 meters. Additionally, the apparatus 100 can be used on any draft vessel up to 22-feet. For example, the modular vertical pipe sections can support approximately 2.5-foot sections, 5-foot sections, and 10-foot sections.

The apparatus 100 can be used for full ocean depth mapping of the seafloor and/or water column on a vessel of opportunity in a foreign country or cable route surveys at both high (e.g., greater than 7 knots) and low (e.g., less than 7 knots) speeds. The apparatus 100 can be rated for remote sensing payloads up to 4,000 pounds, such as full ocean depth multibeams, subbottom profilers, and gondolas. In some examples, the apparatus 100 can be used for water depth up to 10,000 meters.

While the present disclosure has been described with reference to various embodiments, it will be understood that these embodiments are illustrative and that the scope of the disclosure is not limited to them. Those skilled in the art will appreciate that variations from the specific embodiments disclosed above are contemplated by the invention. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A vessel-mounted sensor acquisition apparatus, comprising:

a coupler plate, the coupler plate including a rotatable coupler and a rigid coupler; an upper attachment portion, the upper attachment portion including a first pipe attachment rotatably coupled to the rotatable coupler of the coupler plate and a second pipe attachment removably coupled to the rigid coupler of the coupler plate;

a sensor array portion, the sensor array portion including a plurality of remote sensing sensors; and a first winged pipe segment coupled between the upper attachment portion and the sensor array portion, wherein the first winged pipe segment includes a vibration-reducing wing.

2. The vessel-mounted sensor acquisition apparatus of claim 1, wherein a first distal end of the first winged pipe segment is coupled to the upper attachment portion and a second distal end of the first winged pipe segment is coupled to the sensor array portion.

3. The vessel-mounted sensor acquisition apparatus of claim 1, further comprising a second winged pipe segment including a vibration-reducing wing, wherein the second winged pipe segment is coupled between the first winged pipe segment and the sensor array portion.

4. The vessel-mounted sensor acquisition apparatus of claim 1, wherein:

the first winged pipe segment comprises a hollow pipe segment and a wing portion; and the wing portion encloses an outer circumference of the hollow pipe segment.

5. The vessel-mounted sensor acquisition apparatus of claim 4, wherein the wing portion is disposed along an outer surface of the hollow pipe segment.

6. The vessel-mounted sensor acquisition apparatus of claim 1, wherein a wing portion of the first winged pipe segment is symmetric about a plane extending through a longitudinal axis of the first winged pipe segment, wherein the wing portion is configured to mitigate vortex induced vibrations when the vessel-mounted sensor acquisition apparatus is in a deployed position.

7. The vessel-mounted sensor acquisition apparatus of claim 6, wherein the longitudinal axis of the first winged pipe segment is parallel to a longitudinal axis of the vessel-mounted sensor acquisition apparatus.

8. The vessel-mounted sensor acquisition apparatus of claim 1, wherein the first pipe attachment and the second pipe attachment are orthogonal to a longitudinal axis of the vessel-mounted sensor acquisition apparatus.

9. The vessel-mounted sensor acquisition apparatus of claim 1, wherein an axis of rotation associated with the rotatable coupler of the coupler plate is perpendicular to a longitudinal axis of the vessel-mounted sensor acquisition apparatus.

10. The vessel-mounted sensor acquisition apparatus of claim 1, wherein the rotatable coupler is rotatable between a stowed position associated with the vessel-mounted sensor acquisition apparatus and a deployed position associated with the vessel-mounted sensor acquisition apparatus.

11. A remote sensing acquisition system, comprising:

a coupler plate, the coupler plate including a rotatable coupler and a rigid coupler;

an upper attachment portion, the upper attachment portion including a first pipe attachment rotatably coupled to the rotatable coupler of the coupler plate and a second pipe attachment removably coupled to the rigid coupler of the coupler plate;

a sensor array portion, the sensor array portion including a plurality of remote sensing sensors; and a first winged pipe segment coupled between the upper attachment portion and the sensor array portion, wherein the first winged pipe segment includes a vibration-reducing wing.

12. The remote sensing acquisition system of claim 11, wherein a first distal end of the first winged pipe segment is coupled to the upper attachment portion and a second distal end of the first winged pipe segment is coupled to the sensor array portion.

13. The remote sensing acquisition system of claim 11, further comprising a second winged pipe segment including a vibration-reducing wing, wherein the second winged pipe segment is coupled between the first winged pipe segment and the sensor array portion.

14. The remote sensing acquisition system of claim 11, wherein:

the first winged pipe segment comprises a hollow pipe segment and a wing portion; and the wing portion encloses an outer circumference of the hollow pipe segment.

15. The remote sensing acquisition system of claim 14, wherein the wing portion is disposed along an outer surface of the hollow pipe segment.

16. The remote sensing acquisition system of claim 11, wherein:

the first winged pipe segment includes a wing portion, wherein the wing portion is symmetric about a plane extending through a longitudinal axis of the first winged pipe segment, wherein the wing portion configured to mitigate vortex induced vibrations when the remote sensing acquisition system is in a deployed position.

17. The remote sensing acquisition system of claim 16, wherein the longitudinal axis of the first winged pipe segment is parallel to a longitudinal axis of the remote sensing acquisition system.

18. The remote sensing acquisition system of claim 11, wherein the first pipe attachment and the second pipe attachment are orthogonal to a longitudinal axis of the remote sensing acquisition system.

19. The remote sensing acquisition system of claim 11, wherein an axis of rotation associated with the rotatable coupler of the coupler plate is perpendicular to a longitudinal axis of the remote sensing acquisition system.

20. The remote sensing acquisition system of claim 11, wherein the rotatable coupler is rotatable between a stowed position associated with the remote sensing acquisition system and a deployed position associated with the remote sensing acquisition system.

* * * * *